(12) United States Patent
Goldsborough

(10) Patent No.: X9636
(45) Date of Patent: May 6, 1836

(54) THRASHING MACHINE

(76) Inventor: Nicholas Goldsborough

Nicholas Goldsborough Talbot Maryland

Letters Patent

The Schedule referred to in these Letters Patent and making part of the same containing a description in the words of the said Nicholas Goldsborough himself of his improvement in the machine for Husking and Shelling Corn at one operation.

To all to whom these presents shall come Be it known that I Nicholas Goldsborough of the County of Talbot and State of Maryland have invented a new and useful improvement in a machine for husking and shelling corn at one operation and that the following is a full and exact description of the construction and operation of the said machine as invented and improved by me.

The Machine consists of a frame Cylinder [illegible] concave and feeding apron. First the Frame is constructed of substantial timber sufficiently large to receive the other machinery hereinafter described, it is composed of four upright posts to wit two front and two back posts joined together by side rails and cross [illegible] the upper rails being tenoned into the middle points of the front posts and into the back posts near their upper ends forming the bearings of the Cylinder Shaft. The front posts are made considerably longer than the back posts and are united as well as the latter by a cross girth near their foot as also by a cap piece which cap piece of the front posts is attached by means of screw bolts and nuts so as to admit of being removed. Near the middle of the frame are two other strong posts of the same heighth as the front posts halved into the inner sides of the top rails and having their ends tenoned into the lower rails. The front faces of these posts are grooved to receive the side pieces of the concave to be described their inner faces being likewise furnished with grooves near the top into which a slide plank is fixed which together with a broad horizontal plank resting on the top edges of the sides of the concave forms the covering or Cylinder hood. Second the Cylinder is made of solid wood banded at the ends having [illegible] steel gudgeons which run in suitable boxes secured on the top of the side rails midway between the front and middle posts and projecting past the rails are furnished with band pulleys differing in size so as to vary the velocity the teeth are made of bars [illegible] inch square cut into lengths of 3 inches
the ends of which being ragged is driven perpendicular into the cylinder after
being bored for that purpose so as to stand in parallel rows round the cylinder with
one of their angles forward the teeth of each row standing opposite to the spaces in the
adjoining row. The dimensions of the Cylinder may be varied but those which I find
to answer well are 12 inches diameter by 2 feet 3 [illegible] inches long with [illegible] rows
of teeth and the wheels 6 and 8 inches diameter.

Then the Concave which occupies about one third of the
circumference of the Cylinder immediately under it is formed of 3/4 inch
square bar-iron cut into proper lengths which rest in square mortice holes
contained in two cast iron plates that are let in and secured to two strong
planks, side pieces or joints, which after the bars together with a strong
wooden cross beam are placed in them slide in between the front posts
their tenons entering the front grooves in the middle posts already mentioned
by which and the same bolts that secure them to the front posts they are held
firmly in place; the bars about 13 in all are arranged nearly touching
each other so that one of their angles is next the Cylinder and within about
one inch distance from the ends of the teeth being found that the best distance
in practice. I make the two bars next to the lip of the apron of inch square
iron and instead of being placed diagonally or with their angles next to
the cylinder their faces form a continuation of the plane of the feeding apron.
the effect of which is to cause the machine to feed regularly.

These bars are not placed in actual
contact but with a small space between them. The other sections or
joints similar to those first described and similarly attached to the
frame rest on the upper edges of the lower joints with which they are
so matched as to admit of their being changed that is the upper pair
may be substituted in place of the lower. & the lower for the upper the edges
of both pairs being notched for the passage of the gudgeons of the Cylinder.

The [illegible] plates are however so calculated as
to bring the bars when in them to about a scant 1/4 of an inch from the
Cylinder teeth that being the best distance for threshing out wheat should
it be desired to use the Machine for that purpose, also the bars in these are to be placed diagonally without exception. Fourth the feeding apron
which in my machine is not confined is made in the usual manner of
light boards with side pieces the under side of the lip or front edge which
rests on the cross bar of the joints already mentioned is furnished with a slip
of wood which forms a shoulder that prevents its slipping forward.

(The lip of the apron must be 1/3 the di-
ameter of the Cylinder below the level of its centre and the inclination should
be 80° I have omitted to mention the bonnet which is suspended to the front
posts of the Cylinder and the use of which is to prevent the grain being thrown
to a distance when discharged from the machine as its construction and
use are known to any one conversant with the subject.

Operation. The machine being set in
revolution by horse or other power applied to the band pulley the ears of
corn in the husk are thrown upon the apron and immediately pass down
to the first bar of the concave where from the peculiar relative position of the
parts they are acted upon by the teeth of the Cylinders so as to be drawn between
the diagonal bars & teeth by the joint operation of which the husk is remo-
ved and the corn shelled the whole being afterwards discharged on the op-
posite side of the machine, also for discharging the dust although it is not
mentioned in the description of my Machine I use a chimney constructed of
light boards situated over the Cylinder instead of the cover as herein before
described being gathered like an ordinary house chimney to about 1 foot
square and carried straight up through the roof of the barn so high
enough not to allow the grain to pass out. From practice I have found that
the husk is not only removed but torn into fine strips and perfectly cleaned
from dust and grit by which it is well prepared as food for stock and is
rendered more acceptable. The machine performs all its operations with
great rapidity being as fast as two or three active hands are able to throw
the ears upon the apron it also shells corn perfectly clean which has been
previously husked. If it is desired to thresh wheat, the Cylinder hood, bonnet
and cap piece being removed and the screw bolts of the joints withdrawn
the concave and Cylinder are taken out and the bars shifted to the upper
joints which are substituted for the lower and the latter placed above so that the right hand disc joint occupies the place of the lower left hand
one and the reverse. the Irons, bolts & other parts being returned to their places.

I then apply a board placed edge
wise on the ground under the Concave out of which a circular segment is cut
so as to adapt it to the circumference of the Concave, the object of which is to
stiffen the bars and prevent any spring of which there should be none when
threshing wheat, the velocity of the beater is then increased by using the [illegible]
pulley. the wheat is then thrown into the machine in the usual way and by
its operation threshed perfectly clean. the operation on wheat has been fully
tested and it appears that this last arrangement is equally well adapted
to small grain and all the varieties of grass seeds.

Now what I claim as new in the above machine
and as my improvement for which I ask Letters Patent is the Combination
and arrangement of its parts by the operation of which as herein set forth and
described the Corn is not only shelled but also husked and the husk thereby
rendered much more valuable food for Stock.

In testimony that the foregoing is a true spe-
cification of my said Improvement I have hereunto set my hand at the
City of Washington this 24 day of March 1854

Recd. [illegible]

Witnesses
W. T. [illegible]
A. H. [illegible]

C. A. [illegible]

[172 5[illegible]